(12) United States Patent
Kim

(10) Patent No.: US 11,126,370 B2
(45) Date of Patent: Sep. 21, 2021

(54) MEMORY CONTROLLER AND OPERATING METHOD THEREOF

(71) Applicant: SK hynix Inc., Gyeonggi-do (KR)

(72) Inventor: Se Hyun Kim, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 260 days.

(21) Appl. No.: 16/152,983

(22) Filed: Oct. 5, 2018

(65) Prior Publication Data

US 2019/0278512 A1    Sep. 12, 2019

(30) Foreign Application Priority Data

Mar. 12, 2018  (KR) .......................... 10-2018-0028831

(51) Int. Cl.
*G06F 3/06* (2006.01)

(52) U.S. Cl.
CPC .......... *G06F 3/0656* (2013.01); *G06F 3/0616* (2013.01); *G06F 3/0673* (2013.01)

(58) Field of Classification Search
CPC ....... G06F 12/00–16; G06F 3/06–0689; G06F 2212/7211
See application file for complete search history.

(56) References Cited

U.S. PATENT DOCUMENTS

2008/0104308 A1* 5/2008 Mo ...................... G06F 12/0246
                                                   711/103
2013/0275650 A1* 10/2013 Hida ................... G06F 12/0246
                                                   711/102

FOREIGN PATENT DOCUMENTS

| KR | 1020100139149 | 12/2010 |
| KR | 101453264 | 10/2014 |
| KR | 101757560 | 7/2017 |

* cited by examiner

*Primary Examiner* — Nicholas J Simonetti
(74) *Attorney, Agent, or Firm* — IP & T Group LLP

(57) ABSTRACT

A memory controller for controlling an operation of a memory device includes a request receiving circuit and a data characteristic storage circuit. The request receiving circuit receives from a host a flush request and a logical address corresponding to the flush request, and generates a control signal in response to the received flush request. The data characteristic storage circuit stores a cold data list, and updates the cold data list in response to the control signal from the request receiving circuit.

16 Claims, 18 Drawing Sheets

FIG. 9A

| LA ENTRY | DATA CHARACTERISTIC |
|---|---|
| LA1 | Cold |
|  |  |
|  |  |
|  |  |
|  |  |
|  |  |
|  |  |

FIG. 9B

| LA ENTRY | DATA CHARACTERISTIC |
|---|---|
| LA1 | Cold |
| LA2 | Cold |
|  |  |
|  |  |
|  |  |
|  |  |
|  |  |

FIG. 9C

| LA ENTRY | DATA CHARACTERISTIC |
|---|---|
| LA1 | Cold |
| LA2 | Cold |
| LA3 | Cold |
| LA4 | Cold |
| LA5 | Cold |
| LA6 | Cold |
| ... | ... |

FIG. 9D

| LA ENTRY | DATA CHARACTERISTIC |
|---|---|
| LA1 | Cold |
| LA2 | Cold |
| LA3 | Cold |
| LA4 | Not cold |
| LA5 | Cold |
| LA6 | Cold |
| ... | ... |

FIG. 10A

| LA REGION | FLUSH WRITE NUMBER | DATA CHARACTERISTIC |
|---|---|---|
| LAR1 | 00 | Not cold |
| LAR2 | 00 | Not cold |
| LAR3 | 00 | Not cold |
| LAR4 | 00 | Not cold |
| LAR5 | 00 | Not cold |
| LAR6 | 00 | Not cold |
| LAR7 | 00 | Not cold |
| LAR8 | 00 | Not cold |
| LAR9 | 00 | Not cold |
| LAR10 | 00 | Not cold |
| LAR11 | 00 | Not cold |
| LAR12 | 00 | Not cold |
| LAR13 | 00 | Not cold |
| LAR14 | 00 | Not cold |
| LAR15 | 00 | Not cold |
| ... | ... | ... |
| LAR(k-3) | 00 | Not cold |
| LAR(k-2) | 00 | Not cold |
| LAR(k-1) | 00 | Not cold |
| LARk | 00 | Not cold |

FIG. 10B

| LA REGION | FLUSH WRITE NUMBER | DATA CHARACTERISTIC |
|---|---|---|
| LAR1 | 00 | Not cold |
| LAR2 | 00 | Not cold |
| LAR3 | 00 | Not cold |
| LAR4 | 00 | Not cold |
| LAR5 | 00 | Not cold |
| LAR6 | 00 | Not cold |
| LAR7 | 01 | Cold |
| LAR8 | 00 | Not cold |
| LAR9 | 00 | Not cold |
| LAR10 | 00 | Not cold |
| LAR11 | 00 | Not cold |
| LAR12 | 00 | Not cold |
| LAR13 | 00 | Not cold |
| LAR14 | 00 | Not cold |
| LAR15 | 00 | Not cold |
| ... | ... | ... |
| LAR(k-3) | 00 | Not cold |
| LAR(k-2) | 00 | Not cold |
| LAR(k-1) | 00 | Not cold |
| LARk | 00 | Not cold |

FIG. 10C

| LA REGION | FLUSH WRITE NUMBER | DATA CHARACTERISTIC |
|---|---|---|
| LAR1 | 00 | Not cold |
| LAR2 | 00 | Not cold |
| LAR3 | 00 | Not cold |
| LAR4 | 00 | Not cold |
| LAR5 | 00 | Not cold |
| LAR6 | 00 | Not cold |
| LAR7 | 01 | Cold |
| LAR8 | 00 | Not cold |
| LAR9 | 00 | Not cold |
| LAR10 | 00 | Not cold |
| LAR11 | 00 | Not cold |
| LAR12 | 01 | Cold |
| LAR13 | 00 | Not cold |
| LAR14 | 00 | Not cold |
| LAR15 | 00 | Not cold |
| ... | ... | ... |
| LAR(k-3) | 00 | Not cold |
| LAR(k-2) | 00 | Not cold |
| LAR(k-1) | 00 | Not cold |
| LARk | 00 | Not cold |

FIG. 10D

| LA REGION | FLUSH WRITE NUMBER | DATA CHARACTERISTIC |
|---|---|---|
| LAR1 | 00 | Not cold |
| LAR2 | 00 | Not cold |
| LAR3 | 00 | Not cold |
| LAR4 | 01 | Cold |
| LAR5 | 00 | Not cold |
| LAR6 | 00 | Not cold |
| LAR7 | 01 | Cold |
| LAR8 | 00 | Not cold |
| LAR9 | 00 | Not cold |
| LAR10 | 00 | Not cold |
| LAR11 | 00 | Not cold |
| LAR12 | 01 | Cold |
| LAR13 | 00 | Not cold |
| LAR14 | 00 | Not cold |
| LAR15 | 00 | Not cold |
| ... | ... | ... |
| LAR(k-3) | 00 | Not cold |
| LAR(k-2) | 00 | Not cold |
| LAR(k-1) | 01 | Cold |
| LARk | 00 | Not cold |

FIG. 10E

| LA REGION | FLUSH WRITE NUMBER | DATA CHARACTERISTIC |
|---|---|---|
| LAR1 | 00 | Not cold |
| LAR2 | 00 | Not cold |
| LAR3 | 00 | Not cold |
| LAR4 | 01 | Cold |
| LAR5 | 00 | Not cold |
| LAR6 | 00 | Not cold |
| LAR7 | 10 | Not cold |
| LAR8 | 00 | Not cold |
| LAR9 | 00 | Not cold |
| LAR10 | 00 | Not cold |
| LAR11 | 00 | Not cold |
| LAR12 | 01 | Cold |
| LAR13 | 00 | Not cold |
| LAR14 | 00 | Not cold |
| LAR15 | 00 | Not cold |
| ... | ... | ... |
| LAR(k-3) | 00 | Not cold |
| LAR(k-2) | 00 | Not cold |
| LAR(k-1) | 00 | Not cold |
| LARk | 00 | Not cold |

FIG. 10F

| LA REGION | FLUSH WRITE NUMBER | DATA CHARACTERISTIC |
|---|---|---|
| LAR1 | 00 | Not cold |
| LAR2 | 00 | Not cold |
| LAR3 | 00 | Not cold |
| LAR4 | 01 | Cold |
| LAR5 | 00 | Not cold |
| LAR6 | 00 | Not cold |
| LAR7 | 00 | Not cold |
| LAR8 | 00 | Not cold |
| LAR9 | 00 | Not cold |
| LAR10 | 00 | Not cold |
| LAR11 | 00 | Not cold |
| LAR12 | 01 | Cold |
| LAR13 | 00 | Not cold |
| LAR14 | 00 | Not cold |
| LAR15 | 00 | Not cold |
| ... | ... | ... |
| LAR(k-3) | 00 | Not cold |
| LAR(k-2) | 00 | Not cold |
| LAR(k-1) | 01 | Cold |
| LARk | 00 | Not cold |

MEMORY CONTROLLER AND OPERATING METHOD THEREOF

CROSS-REFERENCE TO RELATED APPLICATION

The present application claims priority under 35 U.S.C. § 119(a) to Korean patent application number 10-2018-0028831, filed on Mar. 12, 2018, which is incorporated herein by reference in its entirety.

BACKGROUND

1. Field of Invention

Various embodiments of the present disclosure generally relate to an electronic device. Particularly, the embodiments relate to a memory controller and an operating method thereof.

2. Description of Related Art

Memory devices may be formed in a two-dimensional structure in which strings are arranged horizontally, or in a three-dimensional structure in which strings are arranged vertically. A three-dimensional semiconductor memory device was devised in order to overcome the degree of integration limit in two-dimensional semiconductor memory devices. A three-dimensional semiconductor memory device may include a plurality of memory cells vertically stacked on a semiconductor substrate. Operation of the memory device is controlled by a memory controller.

SUMMARY

Embodiments provide a memory controller capable of improving the operational reliability of a memory device.

Embodiments also provide an operating method of a memory controller capable of improving the operational reliability of a memory device.

According to an aspect of the present disclosure, there is provided a memory controller for controlling an operation of a memory device, the memory controller including: a request receiving circuit configured to receive from a host a flush request and a logical address corresponding to the flush request, and generate a control signal in response to the received flush request; and a data characteristic storage circuit configured to store a cold data list, and update the cold data list in response to the control signal from the request receiving circuit.

The data characteristic storage circuit may update the cold data list to represent that data stored at the logical address corresponding to the received flush request is cold data.

The memory controller may further include a write buffer configured to store write data received from the host. The request receiving circuit may control the write buffer such that write data corresponding to the received flush request is preferentially output to the memory device.

The memory controller may further include a wear leveling control circuit configured to control a wear leveling operation of the memory device, based on the cold data list stored in the data characteristic storage circuit.

The cold data list may be configured to store a logical address entry corresponding to the received flush request. When no logical address entry corresponding to the received flush request exists in the cold data list, the data characteristic storage circuit may generate a logical address entry corresponding to the received flush request, and update the cold data list to set a characteristic of data corresponding to the generated logical address entry to cold data.

When the logical address entry corresponding to the received flush request exists in the cold data list, the data characteristic storage circuit may update the cold data list to change a characteristic of data corresponding to the logical address entry and corresponding to the received flush request to normal data.

When the characteristic of the data corresponding to the logical address entry changed to normal data is not changed back to cold data for a threshold time, the data characteristic storage circuit may update the cold data list to delete the logical address entry.

When the characteristic of the data corresponding to the logical address entry changed to normal data is not changed again for a threshold time, the data characteristic storage circuit may update the cold data list to change the characteristic of the data corresponding to the logical address entry to cold data.

When data corresponding to a logical address entry included in the cold data list is deleted, the data characteristic storage circuit may update the cold data list to delete the logical address entry.

The cold data list may be configured to store a flush write number with respect to a plurality of logical address regions corresponding to a use region of the memory device. When the flush write number of a logical address region corresponding to the received flush request is 0, the data characteristic storage circuit may increase the flush write number of the logical address region corresponding to the received flush request by 1, and update the cold data list to set a characteristic of the data corresponding to the logical address region to cold data.

When the flush write number of the logical address region corresponding to the received flush request is 1, the data characteristic storage circuit may increase the flush write number of the logical address region corresponding to the received flush request by 1, and update the cold data list to set the characteristic of the data corresponding to the logical address region to normal data.

When the flush write number of the logical address region corresponding to the received flush request is 2, the data characteristic storage circuit may update the cold data list to maintain the flush write number of the logical address region corresponding to the received flush request and the characteristic of the data corresponding to the logical address region.

According to another aspect of the present disclosure, there is provided a method for operating a memory controller for controlling a memory device, the method including: receiving a flush request from a host and a logical address corresponding to the flush request; and updating a cold data list, based on the received flush request and the received logical address, wherein the cold data list includes data indicating whether data stored at a logical address corresponding to the received flush request is cold data.

The method may further include controlling the memory device to write data corresponding to the received flush request.

The cold data list may be configured to store a logical address entry corresponding to the received flush request. The updating of the cold data list, based on the received flush request and the received logical address, may include: determining whether the logical address entry corresponding to the received flush request exists in the cold data list; and updating the cold data list, based on the determination result.

In the updating of the cold data list, based on the determination result, when no logical address entry corresponding to the received flush request exists in the cold data list, a logical address entry corresponding to the received flush request may be generated, and a characteristic of the data corresponding to the generated logical address entry may be set to cold data.

In the updating of the cold data list, based on the determination result, when the logical address entry corresponding to the received flush request exists in the cold data list, a characteristic of the data corresponding to the logical address entry and corresponding to the received flush request may be changed to normal data.

According to another aspect of the present disclosure, there is provided A memory system comprising: a memory device including a memory cell array, and a controller configured to: control, in response to an external flush request, the memory device to flush data into the memory cell array and control the memory device to perform a wear leveling operation to the memory cell array according to whether data stored in the memory cell array is cold data, wherein the controller determines data, which is flushed once, as the cold data.

BRIEF DESCRIPTION OF THE DRAWINGS

Various embodiments will now be described in more detail with reference to the accompanying drawings; however, elements and features of the present invention may be arranged or configured differently than shown or described herein. Thus, the present invention is not limited to the embodiments set forth herein. Rather, these embodiments are provided so that this disclosure is thorough and complete and fully conveys the scope of the embodiments to those skilled in the art.

In the drawings, dimensions of the figures may be exaggerated for clarity of illustration. It will be understood that when an element is referred to as being "between" two elements, it can be the only element between the two elements, or one or more intervening elements may also be present. Like reference numerals refer to like elements throughout.

FIGS. 9A to 9D are diagrams illustrating an embodiment of a cold data list.

FIGS. 10A to 10F are diagrams illustrating another embodiment of the cold data list.

DETAILED DESCRIPTION

Figure 1:
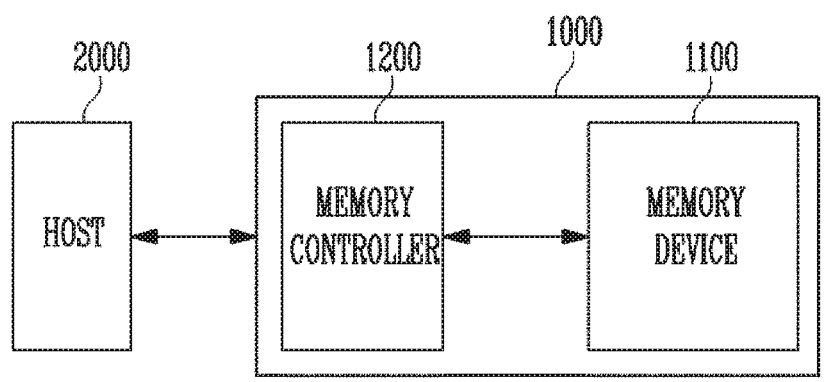
FIG. 1 is a block diagram illustrating a memory system including a memory controller according to an embodiment of the present disclosure.

In the following detailed description, embodiments of the present disclosure are shown and described, simply by way of example. As those skilled in the art would realize, the described embodiments may be modified in various different ways, all without departing from the spirit or scope of the present disclosure. Accordingly, the drawings and description are to be regarded as illustrative in nature and not restrictive.

In the entire specification, when an element is referred to as being "connected" or "coupled" to another element, it can be directly connected or coupled to the another element or be indirectly connected or coupled to the another element with one or more intervening elements interposed. In addition, when an element is referred to as "including" a component, this indicates that the element may further include one or more other components rather than excluding such other component(s), unless the context indicates otherwise. Also, throughout the specification, reference to "an embodiment" or the like is not necessarily to only one embodiment, and different references to "an embodiment" or the like are not necessarily to the same embodiment(s).

Various embodiments of the present disclosure will be described in detail with reference to the accompanying drawings. The same reference numerals are used to designate the same elements as those shown in other drawings. In the following description, only portions necessary for understanding operations according to the embodiments may be described; description of known technical material may be omitted so as to not obscure important concepts of the embodiments.

FIG. 1 is a block diagram illustrating a memory system including a memory controller according to an embodiment of the present disclosure.

Referring to FIG. 1, the memory system 1000 may include a memory device 1100 for storing data and a memory controller 1200 for controlling the memory device 1100 under the control of a host 2000.

The host 2000 may communicate with the memory system 1000 by using an interface protocol such as Peripheral Component Interconnect-Express (PCI-E), Advanced Technology Attachment (ATA), Serial ATA (SATA), Parallel ATA (PATA), or Serial Attached SCSI (SAS). Interface protocols between the host 2000 and the memory system 1000 are not limited to the above-described examples; one of other interface protocols such as a Universal Serial Bus (USB), a Multi-Media Card (MMC), an Enhanced Small Disk Interface (ESDI), and Integrated Drive Electronics (IDE) may be used instead.

The memory device 1100 may perform a program, read or erase operation under the control of the memory controller 1200.

The memory controller 1200 may control the overall operations of the memory system 1000, and control data exchange between the host 2000 and the memory device 1100. For example, the memory controller 1200 may program or read data by controlling the memory device 1100 in response to a request from the host 2000. In some embodiments, the memory device 1100 may include a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), and/or a flash memory.

The memory controller 1200 may perform a wear leveling operation so as to more efficiently control an operation of the memory device 1100 and maximize the lifespan of the memory device 1100. When program/erase operations are frequently or repeatedly performed in a memory region of the memory device 1100 but are rarely performed in another memory region, the memory region in which the program/erase operations are performed more often becomes degraded, and therefore, the lifespan of the memory device 1100 may be reduced. In order to prevent this, the memory controller 1200 performs a wear leveling operation such that all regions of the memory device 1100 are equally programmed/erased. The wear leveling operation may be performed based on characteristics of data, i.e., whether data stored in a specific region is hot data or cold data. The hot data is frequently updated, whereas the cold data is rarely updated. The program/erase operations are frequently performed in a memory region in which hot data is stored, and are rarely performed in a memory region in which cold data is stored. Thus, when reliable information about whether data stored in the memory device 110 is hot data or cold data is known to the memory system 1000 in advance, a wear leveling operation can be more efficiently performed.

The memory controller 1200 according to an embodiment of the present disclosure determines whether data corresponding to a flush request received from the host 2000 is cold data based on the flush request. Under various situations, the host 2000 may transmit a flush request for data, of which write to the memory device 1100 is to be guaranteed, to the memory system 1000. When a flush request is received from the host 2000, the memory controller 1200 may control a write operation of the memory device 1100 to first process writing of data corresponding to the flush request. As for characteristics of data, data necessary for driving of an application executed in the host 2000 or meta data about a specific application may be written to the memory device 1100 by the flush request.

When specific data is flushed to the memory device 1100 in response to a flush request, it is likely that data corresponding to the flush request is cold data. Thus, the memory controller 1200 according to an embodiment of the present disclosure determines whether data corresponding to a flush request is cold data based on the flush request. To this end, the memory controller 1200 may store a cold data list representing whether specific data is cold data. The memory controller 1200 may update the cold data list based on a flush request received from the host 2000 and a logical address corresponding to the flush request.

Accordingly, the memory controller 1200 according to an embodiment of the present disclosure can easily determine whether specific data is cold data. Consequently, the efficiency of the wear leveling operation can be improved, and the operational reliability of the memory device 1100 and the memory system 1000 including the same can also be improved. An embodiment of the memory controller 1200 according to the present disclosure is described below with reference to FIGS. 7 and 8.

Figure 2:
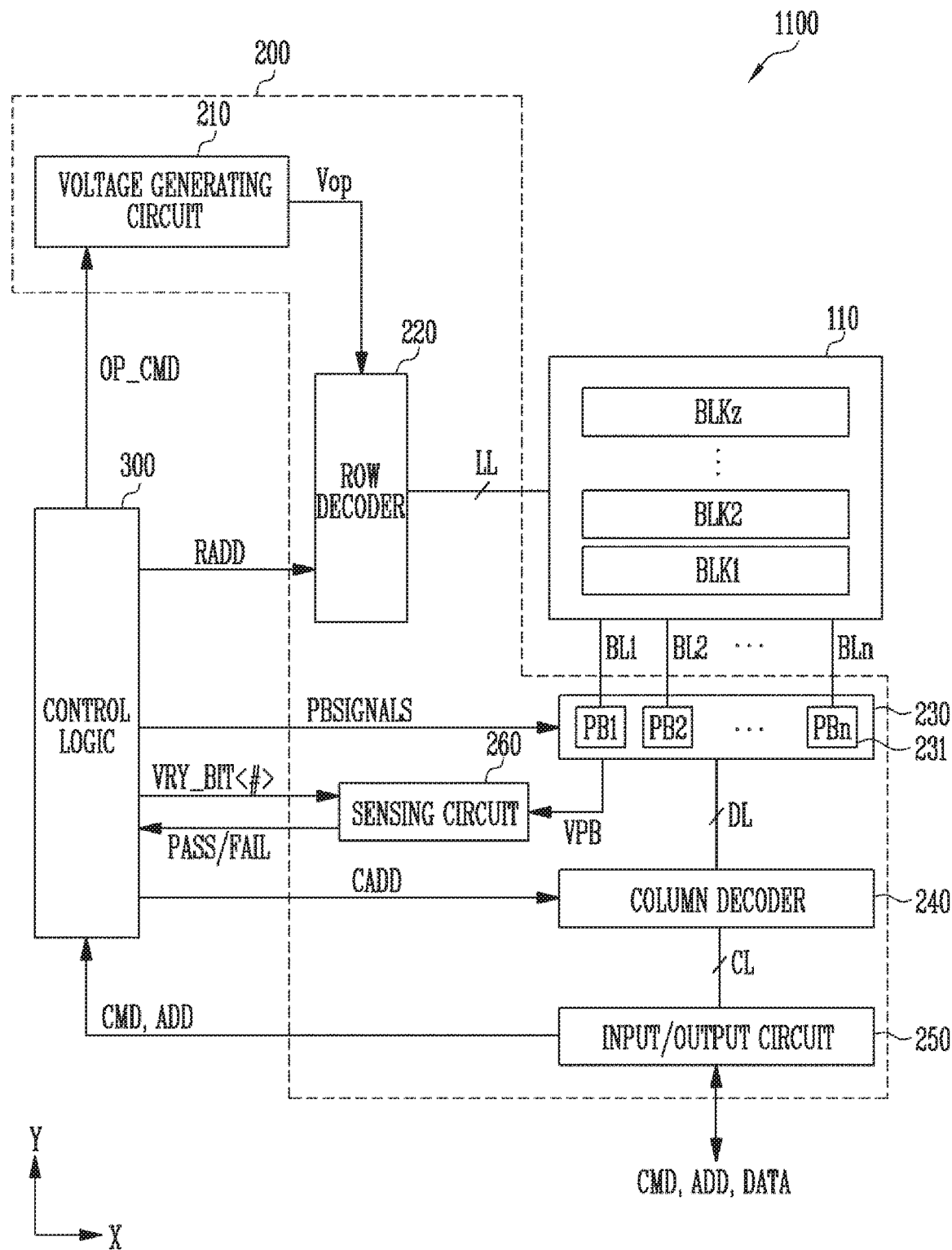
FIG. 2 is a block diagram illustrating a memory device of FIG. 1.

FIG. 2 is a block diagram illustrating the memory device of FIG. 1.

Referring to FIG. 2, the memory device 1110 may include a memory cell array 100 that stores data. The memory device 1110 may include peripheral circuit 200 configured to perform a program operation for storing data in the memory cell array 100, a read operation for outputting the stored data, and an erase operation for erasing the stored data. The memory device 1110 may include control logic 300 that controls the peripheral circuit 200 under the control of the memory controller (1200 of FIG. 1).

The memory cell array 100 may include a plurality of memory blocks BLK1 to BLKz (z is a positive integer). Local lines LL and bit lines BL1 to BLn (n is a positive integer) may be coupled to the memory blocks BLK1 to BLKz. For example, the local lines LL may include a first select line, a second select line, and a plurality of word lines arranged between the first and second select lines. Also, the local lines LL may further include dummy lines arranged between the first select line and the word lines and between the second select line and the word lines. The first select line may be a source select line, and the second select line may be a drain select line. For example, the local lines LL may include word lines, drain and source select lines, and common source lines CSL. For example, the local lines LL may further include dummy lines. For example, the local lines LL may further include pipe lines. The local lines LL may be coupled to the memory blocks BLK1 to BLKz, respectively, and the bit lines BL1 to BLn may be commonly coupled to the memory blocks BLK1 to BLKz. The memory blocks BLK1 to BLKz may be implemented in a two-dimensional or three-dimensional structure. For example, memory cells in the memory blocks BLK1 to BLKz having the two-dimensional structure may be arranged in a direction parallel to a substrate. For example, memory cells in the memory blocks BLK1 to BLKz having the three-dimensional structure may be arranged in a direction vertical to a substrate.

The peripheral circuit 200 may be configured to perform program, read, and erase operations of a selected memory block BLK1 to BLKz under the control of the control logic 300. For example, the peripheral circuit 200, under the control of the control logic 300, may supply verify and pass voltages to the first select line, the second select line, and the word lines, selectively discharge the first select line, the second select line, and the word lines, and verify memory cells coupled a selected word line among the word lines. For example, the peripheral circuit 200 may include a voltage generating circuit 210, a row decoder 220, a page buffer group 230, a column decoder 240, an input/output circuit 250, and a sensing circuit 260.

The voltage generating circuit 210 may generate various operating voltages Vop used for program, read, and erase operations in response to an operation signal OP_CMD. Also, the voltage generating circuit 210 may selectively discharge the local lines LL in response to the operation signal OP_CMD. For example, the voltage generating circuit 210 may generate a program voltage, a verify voltage, pass voltages, a turn-on voltage, a read voltage, an erase voltage, a source line voltage, and the like under the control of the control logic 300.

The row decoder 220 may transfer the operating voltages Vop to local lines LL coupled to a selected memory block BLK1 to BLKz in response to a row address RADD.

The page buffer group 230 may include a plurality of page buffers PB1 to PBn 231 coupled to the bit lines BL1 to BLn. The page buffers PB1 to PBn 231 may operate in response to page buffer control signals PBSIGNALS. For example, the page buffers PB1 to PBn 231 may temporarily store data received through the bit lines BL1 to BLn, or sense voltages or current of the bit lines BL1 to BLn in a read or verify operation.

The column decoder 240 may transfer data between the input/output circuit 250 and the page buffer group 230 in response to a column address CADD. For example, the column decoder 240 may exchange data with the page buffers 231 through data lines DL, or exchange data with the input/output circuit 250 through column lines CL.

The input/output circuit 250 may transfer a command CMD and an address ADD, which are received from the memory controller 1200 of FIG. 1, to the control logic 300, or communicate data DATA with the column decoder 240.

In a read operation or verify operation, the sensing circuit 260 may generate a reference current in response to a permission bit VRY_BIT<#>, and output a pass signal PASS or a fail signal FAIL by comparing a sensing voltage VPB received from the page buffer group 230 with a reference voltage generated by the reference current.

The control logic 300 may control the peripheral circuit 200 by outputting the operation signal OP_CMD, the row address RADD, the page buffer control signals PBSIGNALS, and the permission bit VRY_BIT<#> in response to the command CMD and the address ADD. Also, the control logic 300 may determine whether the verify operation has passed or failed in response to the pass or fail signal PASS or FAIL.

Figure 3:
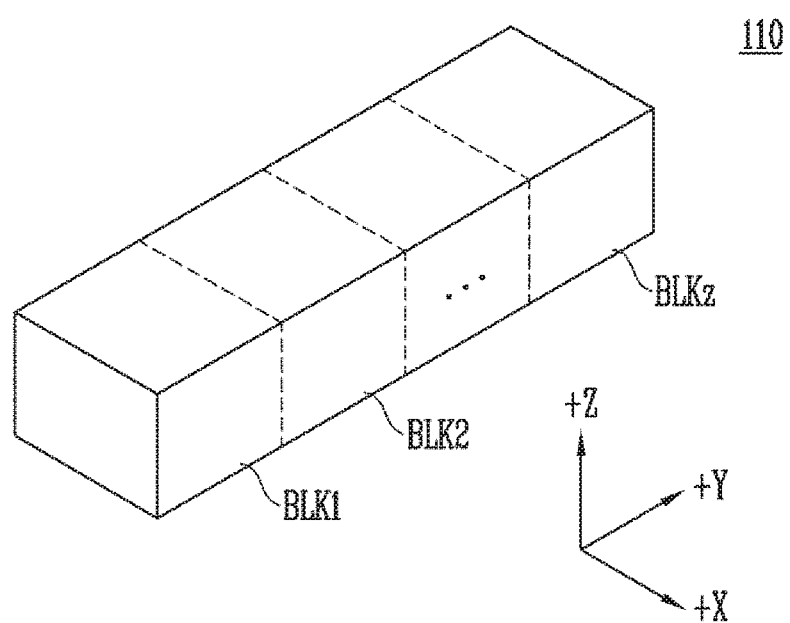
FIG. 3 is a diagram illustrating an embodiment of a memory cell array of FIG. 2.

FIG. 3 is a diagram illustrating an embodiment of the memory cell array of FIG. 2.

Referring to FIG. 3, the memory cell array 110 includes a plurality of memory blocks BLK1 to BLKz. Each memory block has a three-dimensional structure. Each memory block includes a plurality of memory cells stacked above a substrate. The plurality of memory cells are arranged along +X, +Y, and +Z directions. The structure of each memory block is described in more detail with reference to FIGS. 4 and 5.

Figure 4:
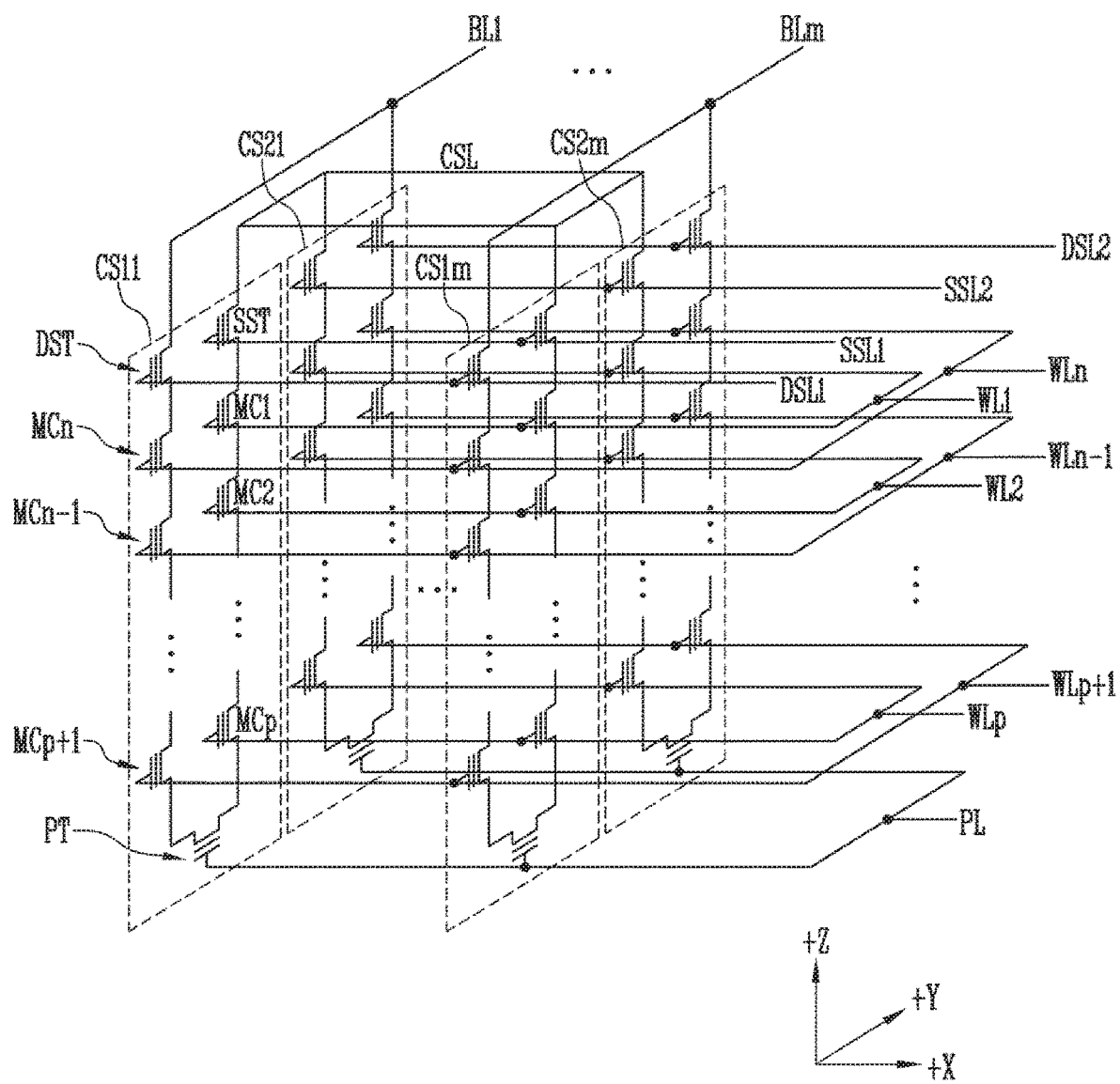
FIG. 4 is a circuit diagram illustrating any one memory block among memory blocks of FIG. 3.

FIG. 4 is a circuit diagram illustrating any one memory block BLKa among the memory blocks BLK1 to BLKz of FIG. 3.

Referring to FIG. 4, the memory block BLKa includes a plurality of cell strings CS11 to CS1m and CS21 to CS2m. In an embodiment, each of the plurality of cell strings CS11 to CS1m and CS21 to CS2m may be formed in a 'U' shape. In the memory block BLKa, m cell strings are arranged in a row direction (i.e., a +X direction). In FIG. 4, it is illustrated that two cell strings are arranged in a column direction (i.e., a +Y direction). However, this is for clarity of illustration; it will be understood that three cell strings may be arranged in the column direction.

Each of the plurality of cell strings CS11 to CS1m and CS21 to CS2m includes at least one source select transistor SST, first to nth memory cells MC1 to MCn, a pipe transistor PT, and at least one drain select transistor DST.

The select transistors SST and DST and the memory cells MC1 to MCn may have structures similar to one another. In an embodiment, each of the select transistors SST and DST and the memory cells MC1 to MCn may include a channel layer, a tunneling insulating layer, a charge storage layer, and a blocking insulating layer. In an embodiment, a pillar for providing the channel layer may be provided in each cell string. In an embodiment, a pillar for providing at least one of the channel layer, the tunneling insulating layer, the charge storage layer, and the blocking insulating layer may be provided in each cell string.

The source select transistor SST of each cell string is coupled between a common source line CSL and memory cells MC1 to MCp.

In an embodiment, the source select transistors of cell strings arranged on the same row are coupled to a source select line extending in the row direction, and the source select transistors of cell strings arranged on different rows are coupled to different source select lines. In FIG. 4, the source select transistors of the cell strings CS11 to CS1m on a first row are coupled to a first source select line SSL1. The source select transistors of the cell strings CS21 to CS2m on a second row are coupled to a second source select line SSL2.

In another embodiment, the source select transistors of the cell strings CS11 to CS1m and CS21 to CS2m may be commonly coupled to one source select line.

The first to nth memory cells MC1 to MCn of each cell string are coupled between the source select transistor SST and the drain select transistor DST.

The first to nth memory cells MC1 to MCn may be divided into first to pth memory cells MC1 to MCp and (p+1)th to nth memory cells MCp+1 to MCn. The first to pth memory cells MC1 to MCp are sequentially arranged in the −Z direction, and are coupled in series between the source select transistor SST and the pipe transistor PT. The (p+1)th to nth memory cells MCp+1 to MCn are sequentially arranged in the +Z direction, and are coupled in series between the pipe transistor PT and the drain select transistor DST. The first to pth memory cells MC1 to MCp and the (p+1)th to nth memory cells MCp+1 to MCn are coupled through the pipe transistor PT. Gate electrodes of the first to nth memory cells MC1 to MCn of each cell string are coupled to first to nth word lines WL1 to WLn, respectively.

A gate of the pipe transistor PT of each cell string is coupled to a pipe line PL.

The drain select transistor DST of each cell string is coupled between a corresponding bit line and the memory cells MCp+1 to MCn. Cell strings arranged in the row direction are coupled to a drain select line extending in the row direction. The drain select transistors of the cell strings CS11 to CS1m on the first row are coupled to a first drain select line DSL1. The drain select transistors of the cell strings CS21 to CS2m on the second row are coupled to a second drain select line DSL2.

Cell strings arranged in the column direction are coupled to a bit line extending in the column direction. In FIG. 4, the cell strings CS11 and CS21 on a first column are coupled to a first bit line BL1. The cell strings CS1m and CS2m on an mth column are coupled to an mth bit line BLm.

Memory cells coupled to the same word line in the cell strings arranged in the row direction constitute one page. For example, memory cells coupled to the first word line WL1 in the cell strings CS11 to CS1m on the first row constitute one page. Memory cells coupled to the first word line WL1 in the cell strings CS21 to CS2m on the second row constitute another page. As any one of the drain select lines DSL1 and DSL2 is selected, cell strings arranged in one row direction may be selected. As any one of the word lines WL1 to WLn is selected, one page may be selected in the selected cell strings.

In another embodiment, even bit lines and odd bit lines may be provided instead of the first to mth bit lines BL1 to BLm. In addition, even-numbered cell strings among the cell strings CS11 to CS1m or CS21 to CS2m arranged in the row direction may be coupled to the even bit lines, respectively, and odd-numbered cell strings among the cell strings CS11 to CS1m or CS21 to CS2m arranged in the row direction may be coupled to the odd bit lines, respectively.

In an embodiment, at least one of the first to nth memory cells MC1 to MCn may be used as a dummy memory cell. For example, the dummy memory cell(s) may be provided to decrease an electric field between the source select transistor SST and the memory cells MC1 to MCp.

Alternatively, the dummy memory cell(s) may be provided to decrease an electric field between the drain select transistor DST and the memory cells MCp+1 to MCn. When the number of dummy memory cells is increased, the reliability of an operation of the memory block BLKa is improved. On the other hand, the size of the memory block BLKa is increased. When the number of dummy memory cells is decreased, the size of the memory block BLKa is decreased. On the other hand, the reliability of an operation of the memory block BLKa may be deteriorated.

In order to efficiently control the dummy memory cell(s), the dummy memory cell(s) may have a required threshold voltage. Before or after an erase operation of the memory block BLKa, a program operation may be performed on all or some of the dummy memory cells. When an erase operation is performed after the program operation is performed, the threshold voltage of the dummy memory cells control a voltage applied to the dummy word lines coupled to the respective dummy memory cells, so that the dummy memory cells can have the required threshold voltage.

Figure 5:
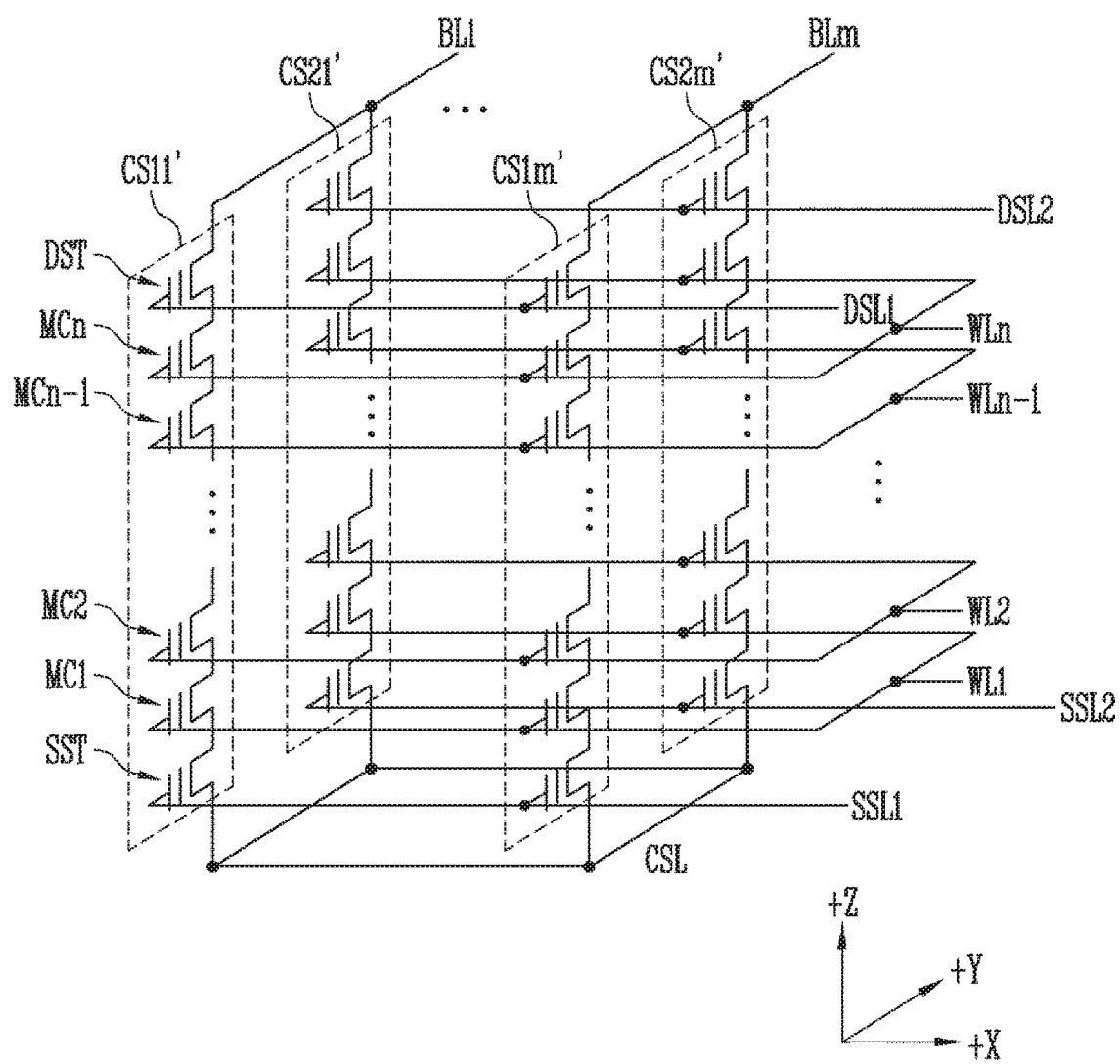
FIG. 5 is a circuit diagram illustrating another embodiment of any one memory block among the memory blocks of FIG. 3.

FIG. 5 is a circuit diagram illustrating another embodiment BLKb of the one memory block among the memory blocks BLK1 to BLKz of FIG. 3.

Referring to FIG. 5, the memory block BLKb includes a plurality of cell strings CS11' to CS1m' and CS21' to CS2m'. Each of the plurality of cell strings CS11' to CS1m' and CS21' to CS2m' extends along the +Z direction. Each of the plurality of cell strings CS11' to CS1m' and CS21' to CS2m' includes at least one source select transistor SST, first to nth memory cells MC1 to MCn, and at least one drain select transistor DST, which are stacked on a substrate (not shown) under the memory block BLKb.

The source select transistor SST of each cell string is coupled between a common source line CSL and the memory cells MC1 to MCn. The source select transistors of cell strings arranged on the same row are coupled to the same source select line. The source select transistors of the cell strings CS11' to CS1m' arranged on a first row are coupled to a first source select line SSL1. Source select transistors of the cell strings CS21' to CS2m' arranged on a second row are coupled to a second source select line SSL2. In another embodiment, the source select transistors of the cell strings CS11' to CS1m' and CS21' to CS2m' may be commonly coupled to one source select line.

The first to nth memory cells MC1 to MCn of each cell string are coupled in series between the source select transistor SST and the drain select transistor DST. Gate electrodes of the first to nth memory cells MC1 to MCn are coupled to first to nth word lines WL1 to WLn, respectively.

The drain select transistor DST of each cell string is coupled between a corresponding bit line and the memory cells MC1 to MCn. The drain select transistors of cell strings arranged in the row direction are coupled to a drain select line extending in the row direction. The drain select transistors of the cell strings CS11' to CS1m' on the first row are coupled to a first drain select line DSL1. The drain select transistors of the cell strings CS21' to CS2m' on the second row are coupled to a second drain select line DSL2.

Therefore, the memory block BLKb of FIG. 5 has a circuit similar to that of the memory block BLKa of FIG. 4. That is, the pipe transistor PT is excluded from each cell string in the memory block BLKb of FIG. 5.

In another embodiment, even bit lines and odd bit lines may be provided instead of the first to mth bit lines BL1 to BLm. In addition, even-numbered cell strings among the cell strings CS11' to CS1m' or CS21' to CS2m' arranged in the row direction may be coupled to the even bit lines, respectively, and odd-numbered cell strings among the cell strings CS11' to CS1m' or CS21' to CS2m' arranged in the row direction may be coupled to the odd bit lines, respectively.

In an embodiment, at least one of the first to nth memory cells MC1 to MCn may be used as a dummy memory cell. For example, the dummy memory cell(s) may be provided to decrease an electric field between the source select transistor SST and the memory cells MC1 to MCn. Alternatively, the dummy memory cell(s) may be provided to decrease an electric field between the drain select transistor DST and the memory cells MC1 to MCn. When the number of dummy memory cells is increased, the reliability of an operation of the memory block BLKb is improved. On the other hand, the size of the memory block BLKb is increased. When the number of dummy memory cells is decreased, the size of the memory block BLKb is decreased. On the other hand, the reliability of an operation of the memory block BLKb may be deteriorated.

In order to efficiently control the dummy memory cell(s), the dummy memory cell(s) may have a required threshold voltage. Before or after an erase operation of the memory block BLKb, a program operation may be performed on all or some of the dummy memory cells. When an erase operation is performed after the program operation is performed, the threshold voltage of the dummy memory cells control a voltage applied to the dummy word lines coupled to the respective dummy memory cells, so that the dummy memory cells can have the required threshold voltage.

As described with reference to FIGS. 3 to 5, the memory blocks BLK1 to BLKz in the memory cell array 110 of FIG. 2 may be formed in a three-dimensional structure. However, as described below, the memory blocks BLK1 to BLKz in the memory cell array 110 of FIG. 2 may be formed in a two-dimensional structure.

Figure 6:
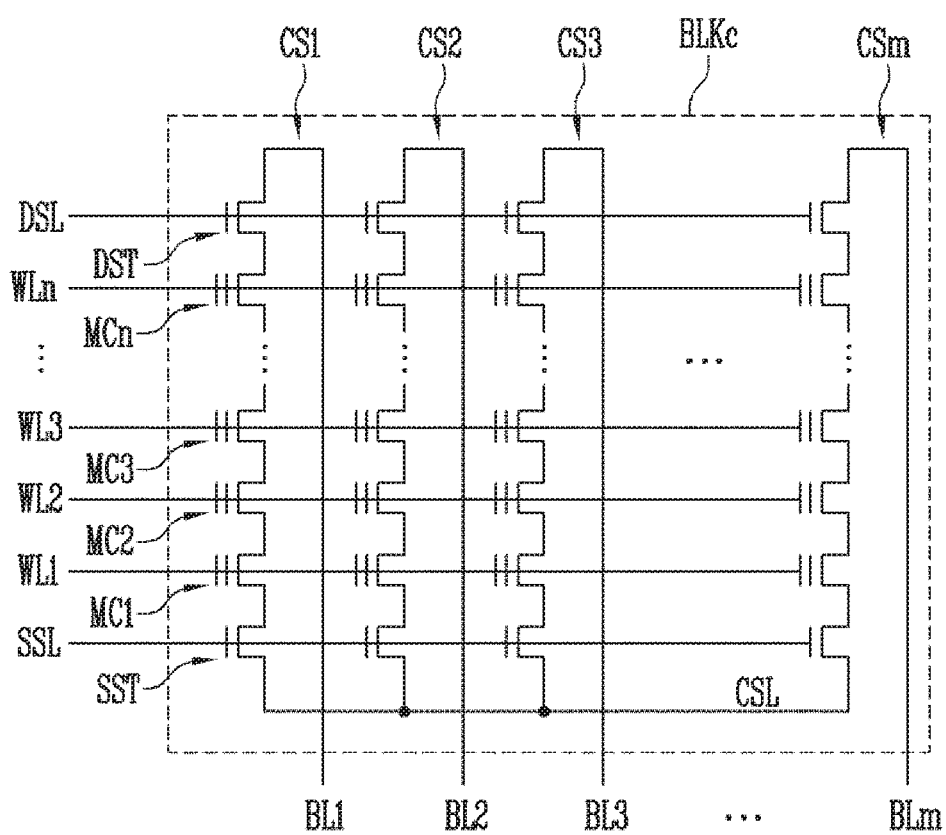
FIG. 6 is a circuit diagram illustrating an embodiment of any one memory block among a plurality of memory blocks included in the memory cell array of FIG. 2.

FIG. 6 is a circuit diagram illustrating an embodiment of any one memory block BLKc among the plurality of memory blocks BLK1 to BLKz in the memory cell array 110 of FIG. 2.

Referring to FIG. 6, the memory block BLKc includes a plurality of strings CS1 to CSm. The plurality of strings CS1 to CSm may be coupled to a plurality of bit lines BL1 to BLm, respectively. Each of the plurality of strings CS1 to CSm includes at least one source select transistor SST, first to nth memory cells MC1 to MCn, and at least one drain select transistor DST.

Each of the select transistors SST and DST and the memory cells MC1 to MCn may have a similar structure. In an embodiment, each of the select transistors SST and DST and the memory cells MC1 to MCn may include a channel layer, a tunneling insulating layer, a charge storage layer, and a blocking insulating layer. The source select transistor SST of each cell string is coupled between a common source line CSL and the memory cells MC1 to MCn.

The first to nth memory cells MC1 to MCn of each cell string is coupled between the source select transistor SST and the drain select transistor DST.

The drain select transistor DST of each cell string is coupled between a corresponding bit line and the memory cells MC1 to MCn.

Memory cells coupled to the same word line constitute one page. As a drain select line DSL is selected, the cell strings CS1 to CSm may be selected. As any one of word lines WL1 to WLn is selected, one page among selected cell strings may be selected.

In another embodiment, even bit lines and odd bit lines may be provided instead of the first to mth bit lines BL1 to BLm. Even-numbered cell strings among the cell strings CS1 to CSm arranged may be coupled to the even bit lines, respectively, and odd-numbered cell strings among the cell strings CS1 to CSm may be coupled to the odd bit lines, respectively.

As shown in FIG. 6, the memory blocks BLK1 to BLKz in the memory cell array 110 of FIG. 2 may be formed in a two-dimensional structure. However, as described with reference to FIGS. 3 to 5, the memory blocks BLK1 to BLKz in the memory cell array 110 of FIG. 2 may be formed in a three-dimensional structure.

Figure 7:
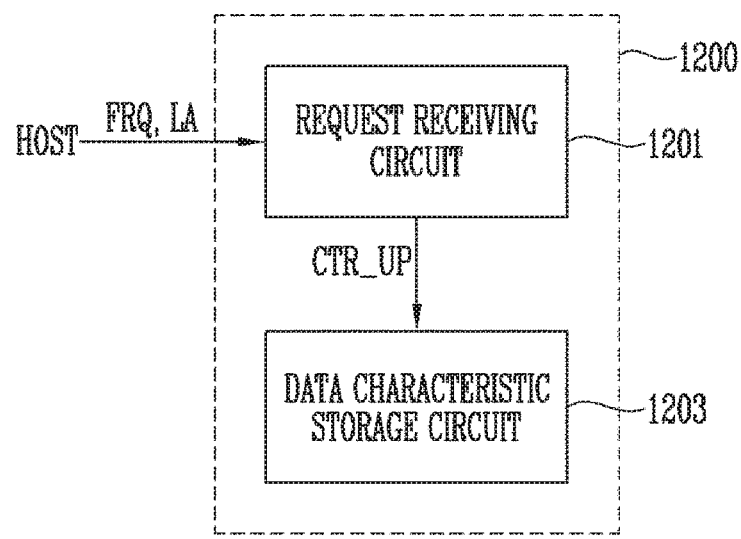
FIG. 7 is a block diagram illustrating an example of the memory controller of FIG. 1.

FIG. 7 is a block diagram illustrating an example of the memory controller of FIG. 1.

Referring to FIG. 7, the memory controller 1200 includes a request receiving circuit 1201 and a data characteristic storage circuit 1203. The request receiving circuit 1201 receives a flush request FRQ and a logical address LA corresponding to the received flush request FRQ from the host.

Also, the request receiving circuit 1201 generates a control signal CTR_UP in response to the flush request FRQ. The control signal CTR_UP may be a signal for updating a cold data list. The request receiving circuit 1201 may receive other various requests, in addition to the flush request FRQ, from the host. When the request received from the host is a flush request FRQ, the request receiving circuit 1201 may generate a control signal CTR_UP and transfer the control signal CTR_UP to the data characteristic storage circuit 1203. The control signal CTR_UP may include information on a logical address LA corresponding to the received flush request FRQ. When the request received from the host is not a flush request FRQ, the request receiving circuit 1201 may not generate the control signal CTR_UP.

The data characteristic storage circuit 1203 stores a cold data list. The cold data list may include information representing whether data corresponding to the flush request is cold data. In order to store the cold data list, the data characteristic storage circuit 1203 may include an SRAM, a DRAM, and/or other suitable storage medium. The data characteristic storage circuit 1203 may update the cold data list in response to the control signal CTR_UP received from the request receiving circuit 1201. More specifically, the data characteristic storage circuit 1203 may update the cold data list based on a logical address LA corresponding to the received flush request FRQ. Accordingly, the data characteristic storage circuit 1203 can update the cold data list to represent that data stored at the logical address LA corresponding to the flush request FRQ is cold data.

An embodiment of the cold data list and an updating method thereof is described below with reference to FIGS. 9A to 9D and 10A to 10F.

Figure 8:
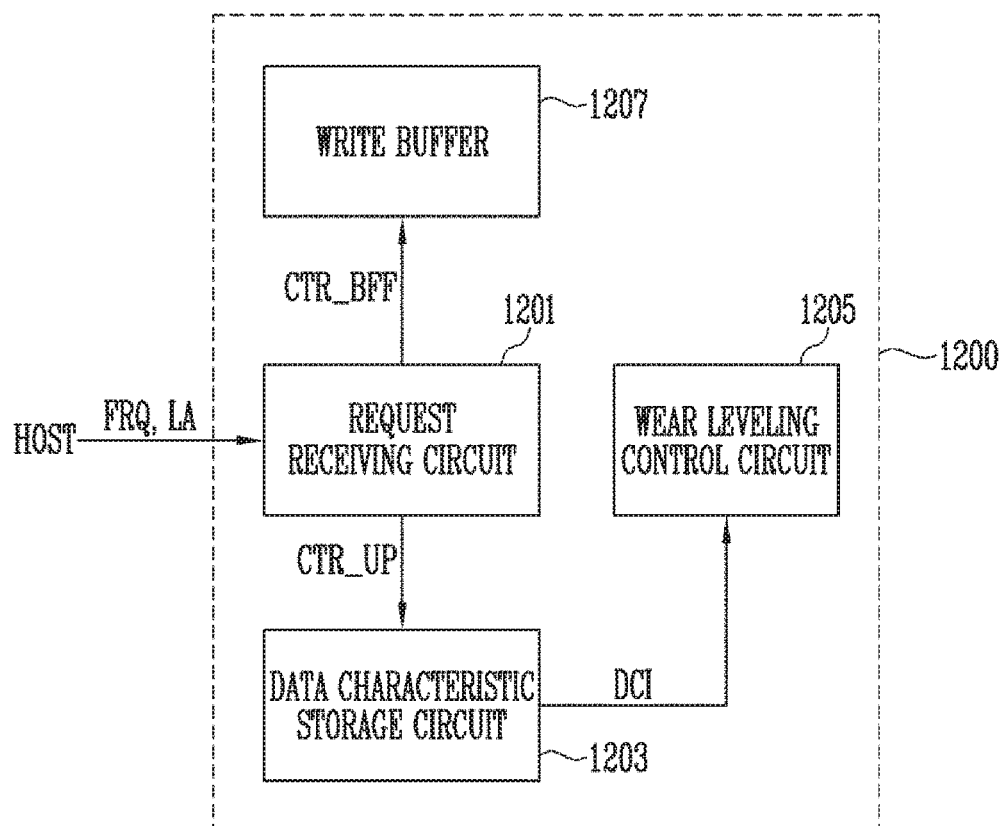
FIG. 8 is a block diagram illustrating in more detail an example of the memory controller of FIG. 1.

FIG. 8 is a block diagram illustrating in more detail an example of the memory controller of FIG. 1.

The memory controller 1200 in FIG. 8 includes the request receiving circuit 1201 and the data characteristic storage circuit 1203 of the memory controller shown in FIG. 7, and further includes a wear leveling control circuit 1205, and a write buffer 1207. The request receiving circuit 1201 and the data characteristic storage circuit 1203 operate as described with reference to FIG. 7.

The write buffer 1207 may store write data from the host. When the host transfers a write request and write data corresponding to the write request to the memory system 1000, the write data is first stored in the write buffer 1207 of the memory controller 1200. The write data stored in the write buffer 1207 is transferred together with a write command to the memory device 1100 under the control of the memory controller 1200. The memory device 1100 may perform a write operation, based on the received write command and the received write data.

The write buffer 1207 may store data corresponding to a plurality of write requests. The sequence in which the data corresponding to the plurality of write requests are transferred to the memory device 1100 may be controlled by the memory controller 1200. In an example, the memory controller 1200 may control transfer of the write data to the memory device 1100 according to the reception order of the write data from the host. When a flush request FRQ is received from the host, the request receiving circuit 1201 of the memory controller 1200 may generate a buffer control signal CTR_BFF and transfer the buffer control signal CTR_BFF to the write buffer 1207. The write buffer 1207 may first output write data corresponding to the received flush request FRQ to the memory device 1100 in response to the buffer control signal CTR_BFF.

The wear leveling control circuit 1205 may control a wear leveling operation of the memory device 1100 based on the cold data list stored in the data characteristic storage circuit 1203. More specifically, the data characteristic storage circuit 1203 may output cold data information DCI indicating which data is cold data to the wear leveling control circuit 1205 based on the cold data list stored therein. The wear leveling control circuit 1205 may control the wear leveling operation of the memory device 1100 using the received cold data information.

FIGS. 9A to 9D are diagrams illustrating an embodiment of the cold data list.

Referring to FIGS. 9A to 9D, the cold data list of this embodiment may be configured in the form of a look-up table, and include two fields. A first field represents information on logical address (LA) entries, and a second field represents information on data characteristics.

A start logical address LA corresponding to a flush request FRQ may be stored in an LA entry field. A plurality of entries may be distinguished from one another by the LA entry field. Information indicating whether data corresponding to a LA entry is cold data may be stored in a data characteristic field.

The cold data list may not initially store any LA entry. Subsequently, when a flush request FRQ is received from the host, an LA entry may be generated as shown in FIG. 9A.

Referring to FIG. 9A, it can be seen that, when the memory controller 1200 receives a first flush request FRQ from the host, a first LA entry is generated in the cold data list. A logical address LA1 of the LA entry field may represent a logical address at which data corresponding to the received first flush request FRQ is started. When an LA entry is generated in the cold data list, a characteristic of corresponding data is set to "Cold." Accordingly, referring to the cold data list shown in FIG. 9A, it can be seen that data of a certain region starting from the logical address LA1 is cold data. The size of the region starting from the logical address LA1 that corresponds to the cold data may be determined in various ways. In an embodiment, when it is predetermined that the average size of data written by the flush request FRQ is 1 megabyte (MB), it may be determined that data stored in a region of 1 MB from the logical address LA1 is cold data. Alternatively, to provide a margin for error, it may be determined that data stored in a region of 2 MB is cold data. An example in which data stored in a region of 1 MB from the logical address LA1 is determined to be cold data will be described.

Referring to FIG. 9B, there is illustrated a case where a second flush request FRQ is received and thus the start logical address LA2 of data corresponding to the second flush request FRQ is generated. In addition, a characteristic of data corresponding to the start logical address LA2 is also set to "Cold." As described above, whenever a flush request FRQ is received from the host, the cold data list can be updated.

Referring to FIGS. 9A to 9C, it can be seen that the cold data list is updated to represent that the data flushed in response to the flush request FRQ received from the host is cold data. This is because it is highly likely that such data on which a flush operation is to be performed will be cold data because of characteristics of the flush operation.

Referring to FIG. 9C, it can be seen that, as a new flush request FRQ is repeatedly received, entries are continuously generated in the cold data list. According to FIGS. 9A to 9C, there is illustrated a method for updating the cold data list to represent that a new LA entry corresponding to cold data by generating a new LA entry when an LA entry corresponding to the received flush request FRQ does not exist in the cold data list. A method for updating the cold data list when a flush request FRQ, corresponding to an LA entry that has already been stored in the cold data list, is received is described with reference to FIG. 9D.

FIG. 9D illustrates a method for updating the cold data list when the memory controller 1200 received a flush request FRQ corresponding to a logical address LA4 from the host, under a situation in which the cold data list is updated as shown in FIG. 9C. An entry corresponding to the logical address LA4 already exists in the cold data list. Under this situation, when the flush request FRQ corresponding to the logical address LA4 is again received, data corresponding to the logical address LA4 is updated. This means that it is highly likely that the data corresponding to the logical address LA4, that is, the data flushed twice or more will not be cold data. While it is highly likely that data written by a flush request FRQ received once will be cold data, it is less likely that data updated by flush requests FRQ received plurality of times will be cold data. Accordingly, when the LA entry LA4 corresponding to the flush request FRQ received from the host already exists in the cold data list, the data characteristic storage circuit 1203 of the memory controller 1200 changes a characteristic of the data corresponding to the LA entry LA4 from "Cold" to "Not Cold." Data having the characteristic of "Not Cold" may mean normal data. After this, when the flush request FRQ corresponding to LA entry LA4 is again received, the data characteristic of "Not Cold" is maintained.

As shown in FIG. 9D, when the data characteristic is changed to "Not Cold", the corresponding LA entry may not be required to be maintained in the data cold list. In an embodiment, such as that of LA4 of FIG. 9D, in the case of an entry of which the characteristic of the corresponding data is changed to "Not Cold", i.e., normal data, the corresponding entry is deleted when the corresponding data is not changed from "Not Cold" back to "Cold" for a first threshold time, which may be predetermined. For example, when data corresponding to the logical address LA4 is not changed from "Not Cold" back to "Cold" for the first threshold time, an LA entry corresponding to the logical address LA4 is deleted. The first threshold time may be appropriately selected according to characteristics of hot data and cold data.

When the first threshold time is set to be excessively short, an entry corresponding to the logical address LA4 may be easily deleted from the cold data list and then be again added to the cold data list in response to a subsequent flush request FRQ. Although data corresponding to the logical address LA4 is not cold data when the first threshold time is set to be excessively short, an LA entry corresponding to that data may be included in the cold data list and that data may be erroneously determined as a cold data.

On the contrary, when the first threshold time is set to be excessively long, an LA entry corresponding to the data that has already been determined to be "Not Cold" is maintained in the cold data list for too long a period of time. Therefore, an excessively large number of unnecessary LA entries may be included in the cold data list, which requires an enormous capacity for storing the cold data list.

Accordingly, the first threshold time can be appropriately determined by reflecting the above-described factors.

In another embodiment, when data is not changed for a long period of time after the data characteristic is changed to "Not Cold" as shown in FIG. 9D, it is highly likely that the data will be cold data. In an embodiment, such as that of LA4 of FIG. 9D, in the case of an entry of which the characteristic of data is changed to "Not Cold", i.e., in the case that such data is determined as normal data, the characteristic of the corresponding entry is again changed from "Not Cold" to "Cold" when the corresponding data is not changed for a second threshold time, which may be predetermined. The second threshold time may be appropriately selected according to characteristics of hot data and cold data.

When data corresponding to any one of LA entries included in the cold data list is deleted, an LA entry corresponding to the data may be deleted. In an example, when data corresponding to the logical address LA4 is deleted, the entry corresponding to the logical address LA4 is deleted. In another example, data corresponding to a logical address LA6 is deleted, the entry corresponding to the logical address LA6 is deleted.

As described with reference to FIGS. 9A to 9D, the memory controller according to an embodiment of the present disclosure determines whether data is cold data based on whether the corresponding data is denoted as cold data when a flush request is firstly received. Accordingly, the memory controller 1200 according to an embodiment of the present disclosure can easily determine whether specific data is cold data. Consequently, the efficiency of the wear leveling operation can be improved, and the operational reliability of the memory device 1100 and the memory system 1000 including the same can also be improved.

FIGS. 10A to 10F are diagrams illustrating another embodiment of the cold data list. The cold data list shown in FIGS. 10A to 10F may be configured in the form of a look-up table obtained by dividing the entire memory region in the memory cell array 110 of the memory device 1100 into k logical address regions LAR1 to LARk. When the capacity of an available memory region of the memory device 1100 is M bytes, each of the logical address regions LAR1 to LARk has a size of M/k bytes in the example of FIG. 10A. The value k may be determined as an appropriately selected value as needed.

The cold data list stores data in association with a flush write number with respect to each of the logical address regions LAR1 to LARk. In an example, a flush write number in the flush number field may be a binary value of 2 bits. As shown in FIG. 10A, the flush write number of each of the logical address regions LAR1 to LARk may be set to "00". When the flush write number is "00", this may mean that the characteristic of the data of the corresponding logical address region is "Not Cold".

Referring to FIG. 10B, there is illustrated a case where a flush request FRQ corresponding to the logical address region LAR7 is received. Accordingly, a flush write number corresponding to the logical address region LAR7 is updated. More specifically, the flush write number corresponding to the logical address region LAR7 is increased from a binary value "00" to a binary value "01". When the flush write number is "01", this may mean that the data characteristic of the corresponding logical address region is "Cold."

Referring to FIG. 10C, there is illustrated a case where a flush request FRQ corresponding to the logical address region LAR12 is received after the flush request FRQ corresponding to the logical address region LAR7 is received. Accordingly, a flush write number corresponding to the logical address region LAR12 is updated. More specifically, the flush write number corresponding to the logical address region LAR12 is increased from "00" to "01".

Referring to FIG. 10D, there is illustrated a cold data list updated by continuously receiving flush requests FRQ as described above. FIG. 10D illustrates a case where a flush request FRQ corresponding to the logical address region LAR(k−1) is received. Accordingly, a flush write number corresponding to the logical address region LAR(k−1) is increased from "00" to "01". Although not shown in FIG. 10D, a flush write number corresponding to at least one of logical address regions located between the logical address region LAR15 and the logical address region LAR(k−2) may be updated.

Referring to FIG. 10E, there is illustrated a case where a flush request FRQ corresponding to the logical address region LAR7 of which flush write number has been updated to "01" is again received. Accordingly, a flush write number corresponding to the logical address region LAR7 is updated. More specifically, the flush write number corresponding to the logical address region LAR7 is increased from the binary value "01" to a binary value "10". When the flush write number is 10, this may mean that the data characteristic of the corresponding logical address region may mean "Not Cold".

When a flush request FRQ is again received with respect to the logical address region LAR7, of which the flush write number is updated to '10' as shown in FIG. 10E, the flush write number may not be increased. This is because, when a flush request FRQ is again received with respect to the logical address region LAR7, of which data characteristic has already been denoted "Not Cold," the data characteristic of "Not Cold" is not changed. Accordingly, although a flush request FRQ is repeatedly received with respect to the logical address region LAR7 under the situation shown in FIG. 10E, the flush write number is not changed.

Referring to FIG. 10F, there is illustrated a cold data list updated when data corresponding to the logical address region LAR7 is deleted. When data corresponding to the logical address region LAR7 of which the flush write number is "10" is deleted, it is necessary to initialize the flush write number of the logical address region LAR7. Accordingly, the flush write number of the logical address region LAR7 is initialized from "10" to "00".

When corresponding data is deleted with respect to each of the logical address regions LAR4, LAR12, and LAR(k−1), of which the flush write number is "01", the flush write number may be initialized from "01" to "00".

As described with reference to FIGS. 10A to 10F, the memory controller according to an embodiment of the present disclosure determines whether data is cold data based on whether the corresponding data is denoted as cold data when a flush request is firstly received. Accordingly, the memory controller 1200 according to an embodiment of the present disclosure can easily determine whether specific data is cold data. Consequently, the efficiency of the wear leveling operation can be improved, and the operational reliability of the memory device 1100 and the memory system 1000 including the same can also be improved.

Figure 11:
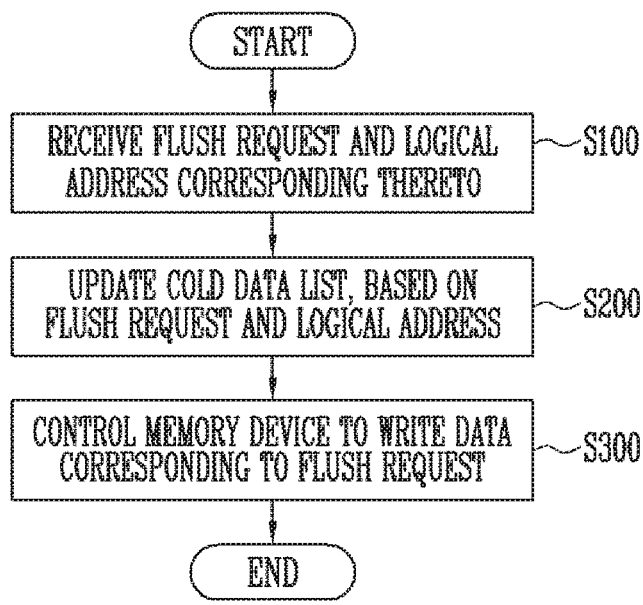
FIG. 11 is a flowchart illustrating an operating method of the memory controller according to an embodiment of the present disclosure.

FIG. 11 is a flowchart illustrating an operating method of the memory controller according to an embodiment of the present disclosure.

Referring to FIG. 11, the operating method of the memory controller according to the embodiment of the present disclosure includes a step S100 of receiving a flush request FRQ and a logical address LA corresponding to the FRQ and a step S200 of updating a cold data list based on the flush request FRQ and the logical address LA.

In the step S100, the request receiving circuit 1201 of the memory controller 1200 may receive a flush request FRQ and a logical address LA corresponding to the FRQ from the host. Subsequently, in the step S200, the request receiving circuit 1201 may generate a control signal CTR_UP in response to the flush request FRQ, and transfer the control signal CTR_UP to the data characteristic storage circuit 1203. The data characteristic storage circuit 1203 may update a cold data list stored therein in response to the received control signal CTR_UP. The cold data list may include data indicating whether data stored at the logical address LA corresponding to the flush request FRQ is cold data.

The cold data list updated in the step S200 may be configured in various ways. According to an embodiment of the present disclosure, the cold data list may be configured such that the memory controller determines that data first written in response to a flush request is cold data and then determines that data changed in response to an additional flush request is not cold data. In an example, the cold data list may be configured as shown in FIGS. 9A to 9D. In another example, the cold data list may be configured as shown in FIGS. 10A to 10F.

A specific example of the step S200 is described below with reference to FIGS. 12 and 13.

In some embodiments, the operating method of the memory controller may further include a step S300 of controlling the memory device such that data corresponding to the flush request FRQ is flushed into the memory device after the cold data list is updated. Referring to FIG. 8, when the request receiving circuit 1201 receives a flush request FRQ, the request receiving circuit 1201 may transfer a buffer control signal CTR_BFF to the write buffer 1207. Accordingly, the write buffer 1207 preferentially transfers data corresponding to the flush request FRQ to the memory device 1100. Thus, in the step S300, the memory controller can control the memory device such that the data corresponding to the flush request FRQ is preferentially flushed into the memory device.

As described above, according to an embodiment of the present disclosure, the memory controller determines whether data is cold data based on whether the corresponding data is denoted as cold data when a flush request is firstly received. Accordingly, the memory controller 1200 can easily determine whether specific data is cold data. Consequently, the efficiency of the wear leveling operation can be improved, and the operational reliability of the memory device 1100 and the memory system 1000 including the same can also be improved.

Figure 12:
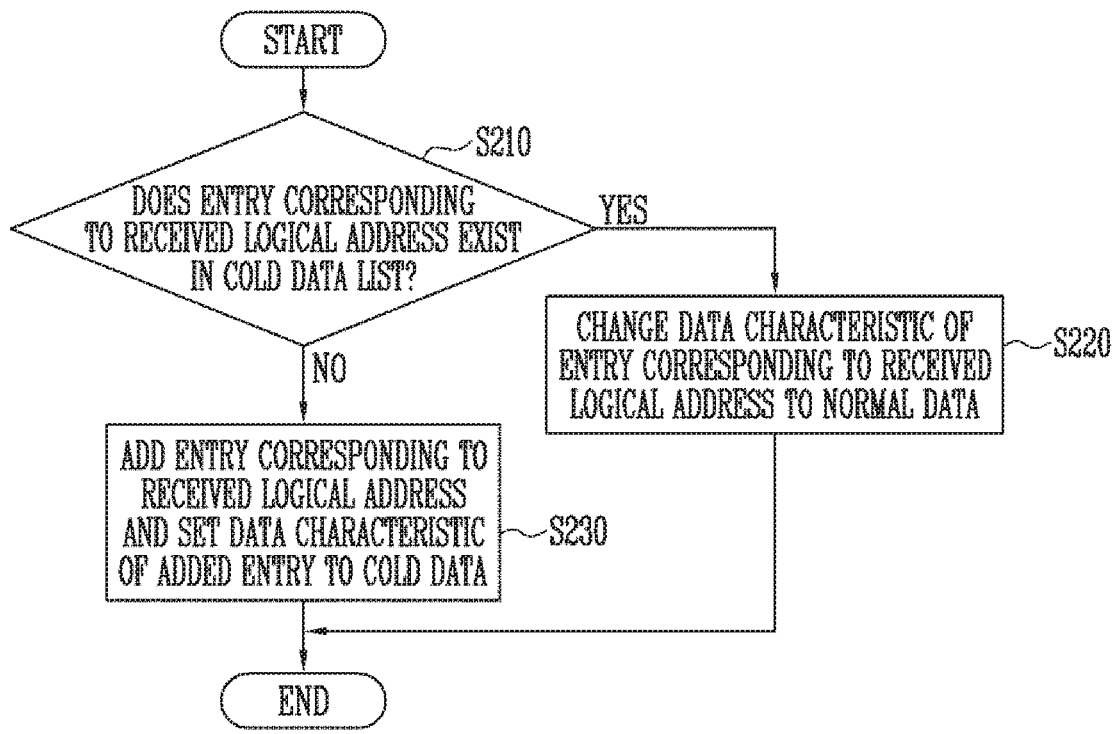
FIG. 12 is a flowchart illustrating an embodiment of updating a cold data list, which is an operation shown in FIG. 11.

FIG. 12 is a flowchart illustrating an embodiment of the step of updating the cold data list, which is shown in FIG. 11. More specifically, a method for updating the cold data list shown in FIGS. 9A to 9D is illustrated in FIG. 12.

Referring to FIG. 12, in step S210, it is determined whether an entry corresponding to the received logical address LA exists in the cold data list. When the entry corresponding to the received logical address LA does not exist in the cold data list (that is, "NO" in step S210), such as the first to sixth LA entries LA1 to LA6 shown in FIGS. 9A to 9C, an entry corresponding to the received logical address LA is added, and the data characteristic of the added entry is set to cold data, in step S230.

When the entry corresponding to the received logical address LA is in the cold data list (that is, "YES" in step S210), such as the fourth LA entry LA4 shown in FIG. 9D, the data characteristic of the corresponding entry is changed from cold data to normal data, in step S220. The characteristic of "Not Cold" illustrated in FIG. 9D may be indicative of normal data as illustrated in the step S220 of FIG. 12.

Figure 13:
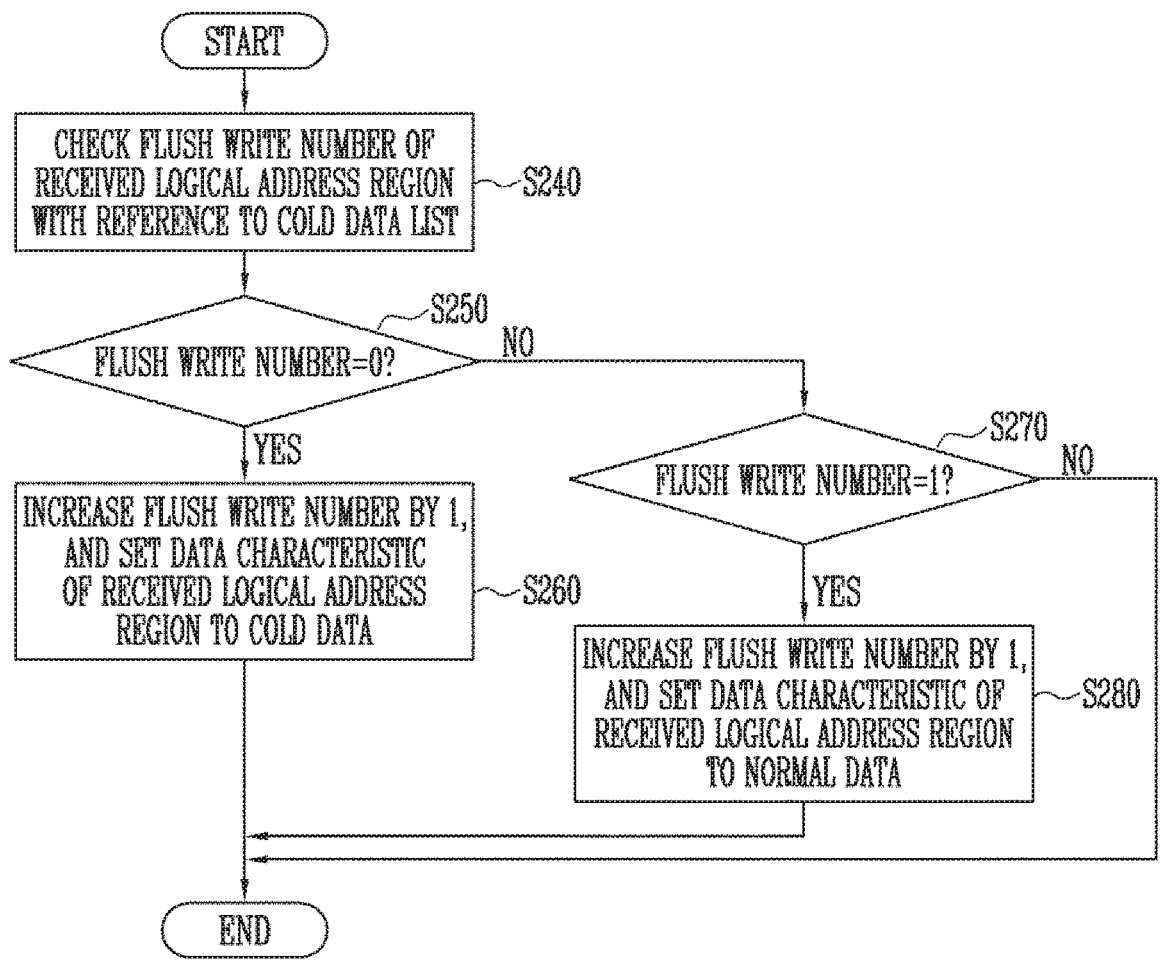
FIG. 13 is a flowchart illustrating another embodiment of updating the cold data list, which is an operation shown in FIG. 11.

FIG. 13 is a flowchart illustrating another embodiment of the step of updating the cold data list, which is shown in FIG. 11. More specifically, a method for updating the cold data list shown in FIGS. 10A to 10F is illustrated in FIG. 13.

Referring to FIG. 13, in step S240, a flush write number of a received logical address region is checked with reference to the cold data list. Subsequently, it is determined whether the flush write number is 0 at step S250. "0" of the step S250 may mean "00" of FIGS. 10A to 10F.

When the flush write number is "0" (that is, "YES" at step S250), the flush write number of the corresponding logical address region is increased by 1, and the data characteristic of the corresponding logical address region is set to cold data, at step S260. For example, the flush write number of the logical address region LAR7 may be increased from "00" to "01" as shown in FIG. 10B.

When the flush write number is not "0" (that is, "NO" at step S250), it is determined whether the flush write number is "1" at step S270. "1" of the step S270 may mean "01" of FIGS. 10A to 10F.

When the flush write number is "1" (that is, "YES" at step S270), the flush write number of the corresponding logical address region is increased by 1, and the data characteristic of the corresponding logical address region is set to normal data (i.e., not cold), at step S280. For example, the flush write number of the logical address region LAR7 may be increased from "01" to "10" as shown in FIG. 10E.

When the flush write number is not "1" (that is, "NO" at step S270), the flush write number of the corresponding logical address region may be "10." Thus, the method ends without increasing the flush write number. Accordingly, the data characteristic of the corresponding logical address region is also maintained as "Not Cold," e.g., normal data.

As described above, according to an embodiment of the present disclosure, the memory controller determines whether data is cold data based on whether the corresponding data is denoted as cold data when a flush request is firstly received. Accordingly, the memory controller 1200 can easily determine whether specific data is cold data. Consequently, the efficiency of the wear leveling operation can be improved, and the operational reliability of the memory device 1100 and the memory system 1000 including the same can also be improved.

Figure 14:
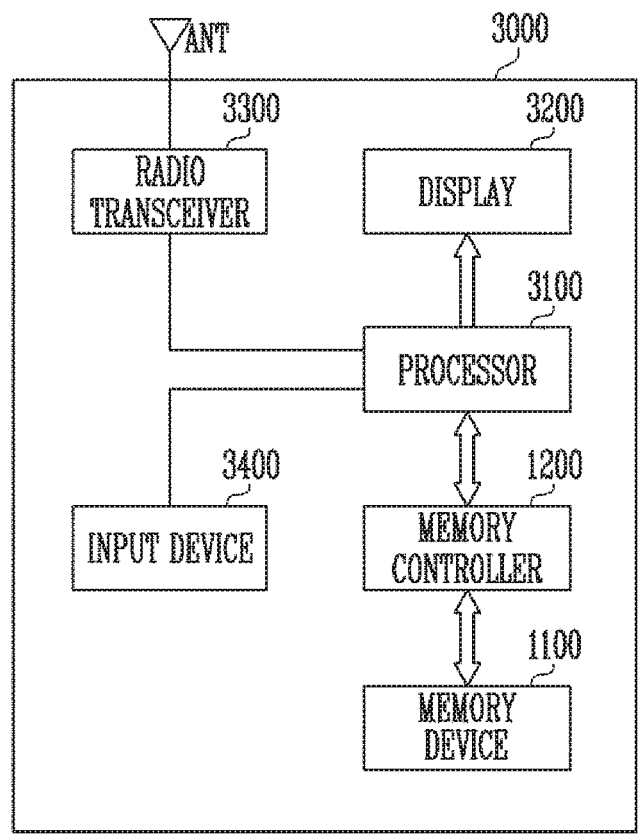
FIG. 14 is a diagram illustrating another embodiment of the memory system including the memory controller shown in FIG. 7.

FIG. 14 is a diagram illustrating an embodiment of the memory system including the memory controller shown in FIG. 7.

Referring to FIG. 14, the memory system 30000 may be implemented as a cellular phone, a smart phone, a tablet PC, a personal digital assistant (PDA), or a wireless communication device. The memory system 30000 may include a memory device 1100 and a memory controller 1200 capable of controlling an operation of the memory device 1100. The memory controller 1200 may control a data access operation of the memory device 1100, e.g., a program operation, an erase operation, a read operation, or the like under the control of a processor 3100.

Data programmed in the memory device 1100 may be output through a display 3200 under the control of the memory controller 1200.

A radio transceiver 3300 may transmit/receive radio signals through an antenna ANT. For example, the radio transceiver 3300 may convert a radio signal received through the antenna ANT into a signal that can be processed by the processor 3100. Therefore, the processor 3100 may process a signal output from the radio transceiver 3300 and transmit the processed signal to the memory controller 1200 or the display 3200. The memory controller 1200 may transmit the signal processed by the processor 3100 to the memory device 1100. Also, the radio transceiver 3300 may convert a signal output from the processor 3100 into a radio signal, and output the converted radio signal to an external device through the antenna ANT. An input device 3400 is a device capable of inputting a control signal for controlling an operation of the processor 3100 or data to be processed by the processor 3100, and may be implemented as a pointing device such as a touch pad or a computer mount, a keypad, or a keyboard. The processor 3100 may control an operation of the display 3200 such that data output from the memory controller 1200, data output from the radio transceiver 3300, or data output from the input device 3400 can be output through the display 3200.

In some embodiments, the memory controller 1200 capable of controlling an operation of the memory device 1100 may be implemented as a part of the processor 3100, or be implemented as a chip separate from the processor 3100.

Figure 15:
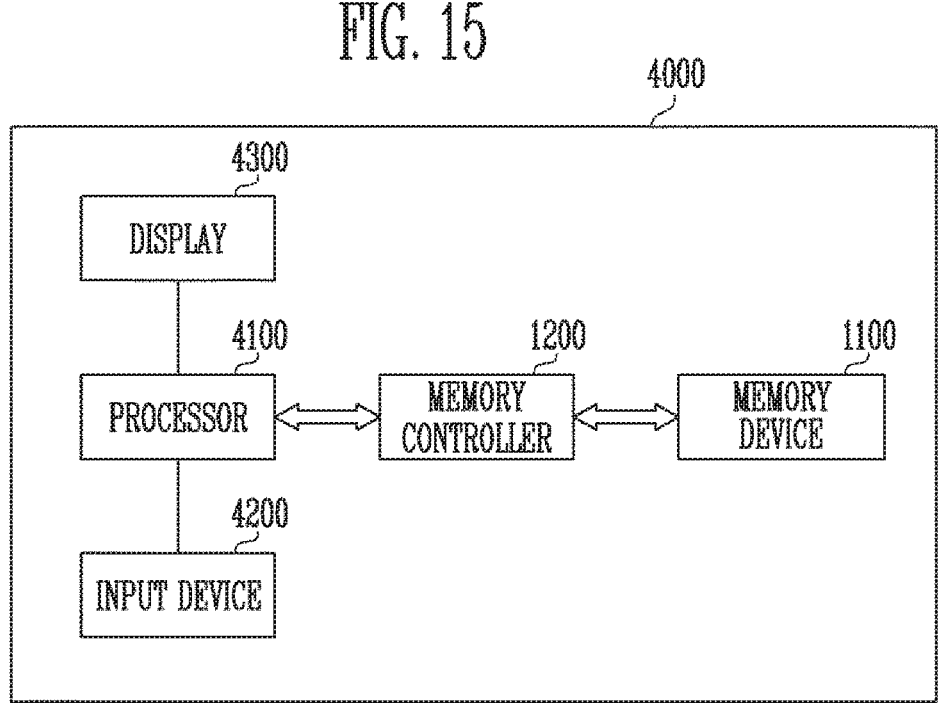
FIG. 15 is a diagram illustrating another embodiment of the memory system including the memory controller shown in FIG. 7.

FIG. 15 is a diagram illustrating an embodiment of the memory system including the memory controller shown in FIG. 7.

Referring to FIG. 15, the memory system 40000 may be implemented as a personal computer (PC), a tablet PC, a net-book, an e-reader, a personal digital assistant (PDA), a portable multimedia player (PMP), an MP3 player, or an MP4 player.

The memory system 40000 may include a memory device 1100 and a memory controller 1200 capable of controlling a data processing operation of the memory device 1100.

A processor 4100 may output data stored in the memory device 1100 through a display 4300 according to data input through an input device 4200. For example, the input device 4200 may be implemented as a pointing device such as a touch pad or a computer mouse, a keypad, or a keyboard.

The processor 4100 may control the overall operations of the memory system 40000, and control an operation of the memory controller 1200. In some embodiments, the memory controller 1200 capable of controlling an operation of the memory device 1100 may be implemented as a part of the processor 4100, or be implemented as a chip separate from the processor 4100.

Figure 16:
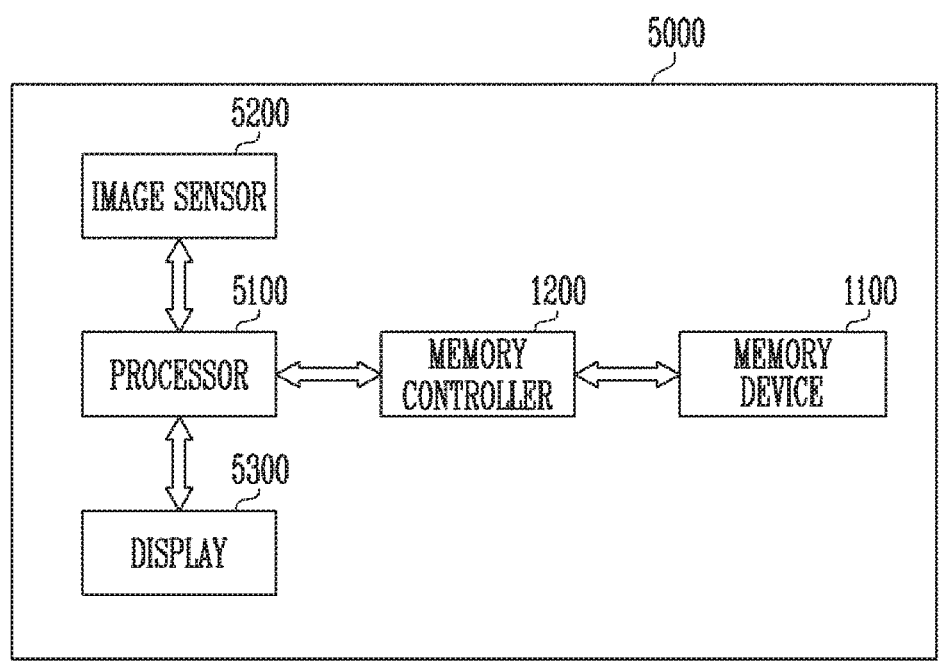
FIG. 16 is a diagram illustrating another embodiment of the memory system including the memory controller shown in FIG. 7.

FIG. 16 is a diagram illustrating an embodiment of the memory system including the memory controller shown in FIG. 7.

Referring to FIG. 16, the memory system 50000 may be implemented as an image processing device, e.g., a digital camera, or other device such as a mobile terminal, a smart phone, or a tablet PC, which has a digital camera attached thereto.

The memory system 50000 may include a memory device 1100 and a memory controller 1200 capable of controlling a data processing operation of the memory device 1100, e.g., a program operation, an erase operation, or a read operation.

An image sensor 5200 of the memory system 50000 may convert an optical image into digital signals, and the converted digital signals may be transmitted to a processor 5100 or the memory controller 1200. Under the control of the processor 5100, the converted digital signals may be output through a display 5300, or be stored in the memory device 1100 through the memory controller 1200. In addition, data stored in the memory device 1100 may be output through the display 5300 under the control of the processor 5100 or the memory controller 1200.

In some embodiments, the memory controller 1200 capable of controlling an operation of the memory device 1100 may be implemented as a part of the processor 5100, or be implemented as a chip separate from the processor 5100.

Figure 17:
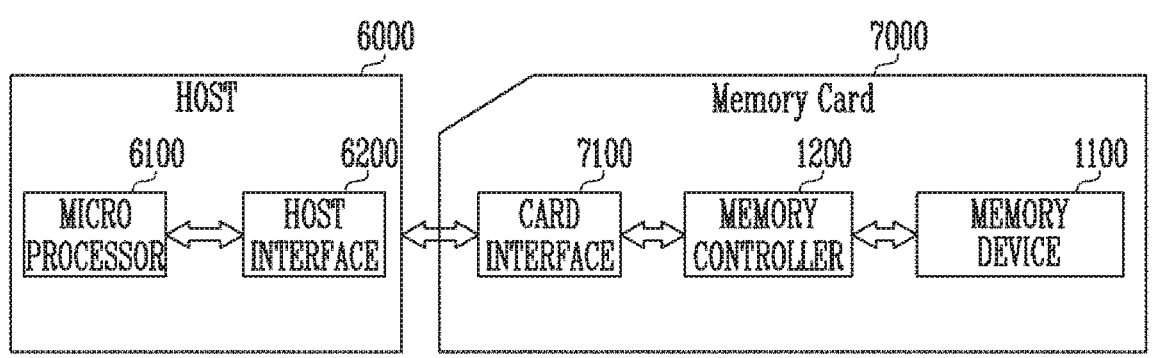
FIG. 17 is a diagram illustrating another embodiment of the memory system including the memory controller shown in FIG. 7.

FIG. 17 is a diagram illustrating an embodiment of the memory system including the memory controller shown in FIG. 7.

Referring to FIG. 17, the memory system 70000 may be implemented as a memory card or a smart card. The memory system 70000 may include a memory device 1100, a memory controller 1200, and a card interface 7100.

The memory controller 1200 may control data exchange between the memory device 1100 and the card interface 7100. In some embodiments, the card interface 7100 may be a secure digital (SD) card interface or a multi-media card (MMC) interface, but the present disclosure is not limited thereto.

The card interface 7100 may interface data exchange between a host 60000 and the memory controller 1200 according to a protocol of the host 60000. In some embodiments, the card interface 7100 may support a universal serial bus (USB) protocol and an inter-chip (IC)-USB protocol. The card interface 7100 may include hardware capable of supporting a protocol used by the host 60000, software embedded in the hardware, or a signal transmission scheme.

When the memory system 70000 is coupled to a host interface 6200 of the host 60000 such as a PC, a tablet PC, a digital camera, a digital audio player, a cellular phone, console video game hardware, or a digital set-top box, the host interface 6200 may perform data communication with the memory device 1100 through the card interface 7100 and the memory controller 1200 under the control of a microprocessor 6100.

According to the present disclosure, a memory controller capable of improving the operational reliability of a memory device is provided.

Further, according to the present disclosure, an operating method of a memory controller capable of improving the operational reliability of a memory device is provided.

Various embodiments have been disclosed herein, and although specific terms are employed, they are used and are to be interpreted in a generic and descriptive sense and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A memory controller for controlling an operation of a memory device, the memory controller comprising:
   a request receiving circuit configured to receive from a host a flush request and a logical address corresponding to the flush request, and generate a control signal in response to the flush request;
   a data characteristic storage circuit configured to store a cold data list, update the cold data list in response to the control signal, set a characteristic of data stored at the logical address corresponding to the flush request as cold data in the cold data list, and change the characteristic of the data to normal data according to a number of flush requests on the logical address; and
   a wear leveling control circuit configured to control a wear leveling operation of the memory device based on the cold data list stored in the data characteristic storage circuit,
   wherein the cold data list is updated based on a comparison between a time elapsed after the characteristic of the data is changed and a threshold time.

2. The memory controller of claim 1, further comprising a write buffer configured to store write data received from the host,
   wherein the request receiving circuit controls the write buffer such that write data corresponding to the flush request is preferentially output to the memory device.

3. The memory controller of claim 1, wherein the cold data list is configured to store a logical address entry corresponding to the flush request,
   wherein, when no logical address entry corresponding to the flush request exists in the cold data list, the data characteristic storage circuit generates a logical address entry corresponding to the flush request, and updates the cold data list to set a characteristic of data corresponding to the generated logical address entry to cold data.

4. The memory controller of claim 3, wherein, when the logical address entry corresponding to the flush request exists in the cold data list, the data characteristic storage circuit updates the cold data list to change a characteristic of data corresponding to the logical address entry and corresponding to the flush request to the normal data.

5. The memory controller of claim 4, wherein, when the characteristic of the data corresponding to the logical address entry changed to the normal data is not changed back to cold data for the threshold time, the data characteristic storage circuit updates the cold data list to delete the logical address entry.

6. The memory controller of claim 4, wherein, when the characteristic of the data corresponding to the logical address entry changed to the normal data is not changed again for the threshold time, the data characteristic storage circuit updates the cold data list to change the characteristic of the data corresponding to the logical address entry to cold data.

7. The memory controller of claim 4, wherein, when data corresponding to a logical address entry included in the cold data list is deleted, the data characteristic storage circuit updates the cold data list to delete the logical address entry.

8. The memory controller of claim 1, wherein the cold data list is configured to store a flush write number with respect to a plurality of logical address regions corresponding to a use region of the memory device, and wherein, when the flush write number of a logical address region corresponding to the flush request is 0, the data characteristic storage circuit increases the flush write number of the logical address region corresponding to the flush request by 1, and updates the cold data list to set a characteristic of data corresponding to the logical address region to cold data.

9. The memory controller of claim 8, wherein, when the flush write number of the logical address region corresponding to the flush request is 1, the data characteristic storage circuit increases the flush write number of the logical address region corresponding to the flush request by 1, and updates the cold data list to set the characteristic of the data corresponding to the logical address region to normal data.

10. The memory controller of claim 8, wherein, when the flush write number of the logical address region corresponding to the flush request is 2, the data characteristic storage circuit updates the cold data list to maintain the flush write number of the logical address region corresponding to the flush request and the characteristic of the data corresponding to the logical address region.

11. A method for operating a memory controller for controlling a memory device, the method comprising:
receiving from a host a flush request and a logical address corresponding to the flush request;
setting a characteristic of data stored at the logical address corresponding to the flush request as cold data in a cold data list;
changing the characteristic of the data to normal data according to a number of flush requests on the logical address;
updating the cold data list based on a comparison between a time elapsed after the characteristic of the data is changed and a threshold time; and
controlling, by a wear leveling control circuit, a wear leveling operation of the memory device based on the cold data list.

12. The method of claim 11, further comprising controlling the memory device to write data corresponding to the flush request.

13. The method of claim 11, wherein the cold data list is configured to store a logical address entry corresponding to the flush request,
wherein the updating of the cold data list, based on the flush request and the received logical address, includes:
determining whether the logical address entry corresponding to the flush request exists in the cold data list; and
updating the cold data list based on the determination result.

14. The method of claim 13, wherein, in the updating of the cold data list, based on the determination result, when no logical address entry corresponding to the flush request exists in the cold data list, a logical address entry corresponding to the flush request is generated, and a characteristic of data corresponding to the generated logical address entry is set to cold data.

15. The method of claim 13, wherein, in the updating of the cold data list, based on the determination result, when the logical address entry corresponding to the flush request exists in the cold data list, a characteristic of data corresponding to the logical address entry and corresponding to the flush request is changed to the normal data.

16. A memory system comprising:
a memory device including a memory cell array; and
a controller configured to:
control, in response to an external flush request, the memory device to flush data into the memory cell array;
set a characteristic of the data flushed according to the external flush request as cold data in a cold data list;
change the characteristic of the data to normal data based on a number of flush requests on the data;
update the cold data list based on a comparison between a time elapsed after the characteristic of the data is changed and a threshold time; and
control the memory device to perform a wear leveling operation on the memory cell array based on the cold data list.

* * * * *